INVENTOR.
Paul Opprecht
BY Michael S. Striker
Attorney

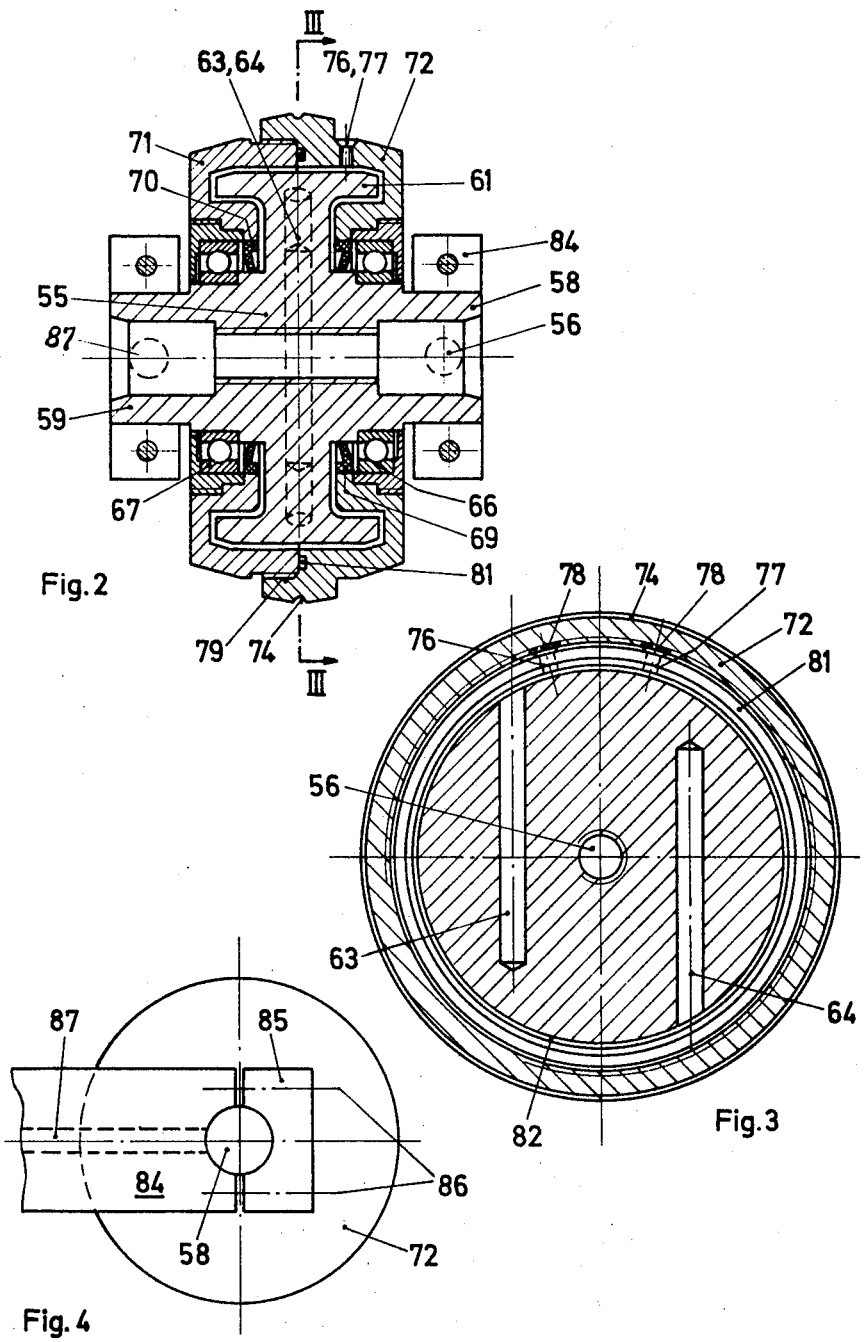

+# United States Patent Office

3,501,611
Patented Mar. 17, 1970

3,501,611
ELECTRODE ROLL FOR WELDING MACHINES
Paul Opprecht, Im hintern Bernold, Bergdietikon, Aargau, Switzerland
Filed May 15, 1968, Ser. No. 729,223
Claims priority, application Switzerland, May 23, 1967, 7,235/67; May 6, 1968, 6,712/68
Int. Cl. B23k *11/06*
U.S. Cl. 219—84                                      15 Claims

ABSTRACT OF THE DISCLOSURE

An electrode roll for welding machines in which an outer roll member partly surrounding an inner roll member is mounted on the latter turnably about the axis thereof and in which the inner surface of the outer roll member is spaced from the outer surface of the inner roll member so as to define between the surfaces an annular gap. The annular gap is sealed and filled with an electrically conductive liquid, for instance mercury, so that electrical currents supplied to the stationarily mounted inner roll member will be transmitted to the outer roll member.

---

This invention relates to an electrode roll for welding machines, in particular for resistance-welding machines with wire electrodes, comprising an internally arranged stator and a rotor mounted thereon, the arrangement being such that the stator and the rotor are interconnected by an electrically conducting liquid, in particular mercury, and that expansion space is provided for the liquid, whereby the roll is designed as a self-contained unit with a self-contained liquid system for the transmission of the electric power from stator to rotor and is provided with a mechanical connection between rotor and stator parts which is independent of the manner of mounting in the welding machine.

The invention is now to be further described by way of example with reference to the drawings, wherein:

FIG. 2 shows an axial section analogous to FIG. 1 through another embodiment of the welding roll;

FIG. 3 shows a section along line III—III in FIG. 2;

FIG. 4 shows a side-view through the end of a carrier arm of a resistance-welding machine with an electrode roll viewed from the side.

Figure 1:
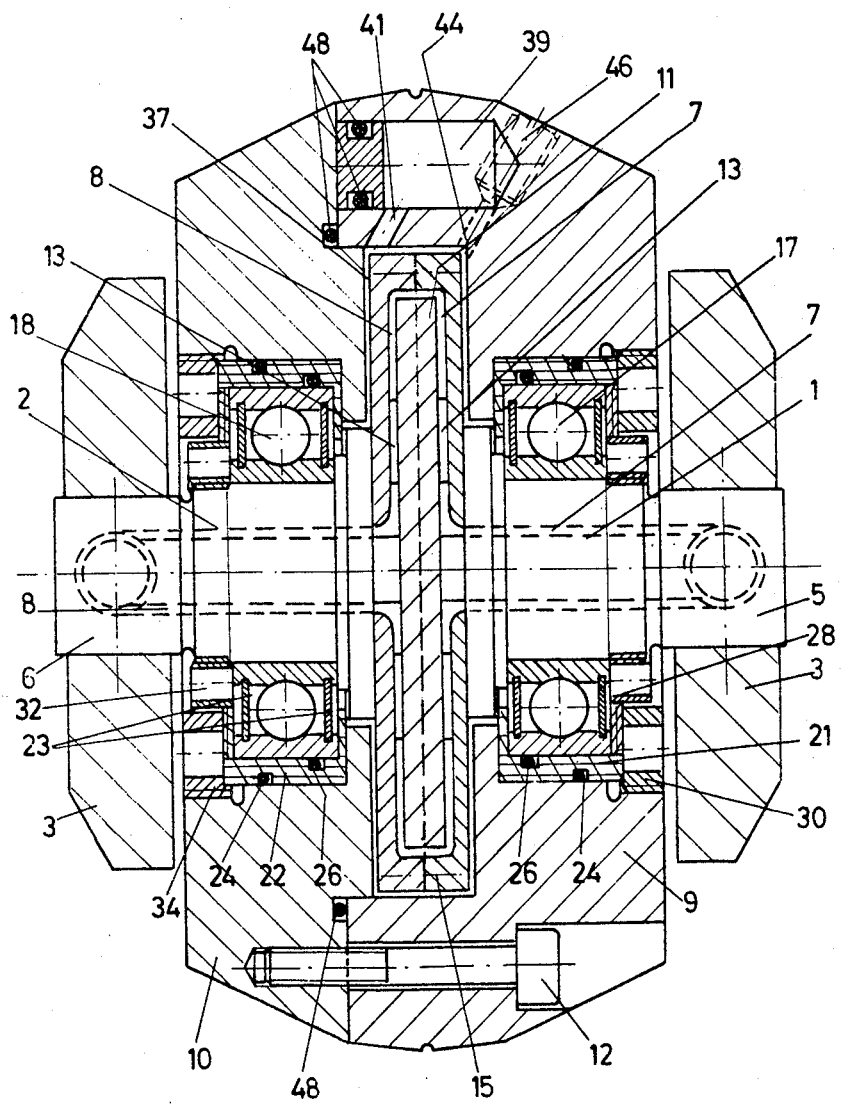
FIG. 1 shows an axial section through a welding roll of a resistance-welding machine with wire electrodes.

The electrode roll comprises an inner rotor member having two shaft sections 1 and 2 which are held together by screws 15 schematically represented by the centre lines. The said shaft sections are mounted on the outer ends 5 and 6 thereof in a fork 3. They are provided internally with coolant channels 7 and 8 for the purpose of cooling the whole roll, and a disk 11 with spacing platelets 13 in the joining area of the two shaft sections concurrently limits the corresponding channels 7 and 8, which to a greater or lesser degree follow the contours of the shaft sections 1 and 2. The outer portion, the rotor member, or housing of the welding roll is also in two sections. The roll housing sections 9 and 10 are held together by bolts 12. The said roll housing 9, 10 is mounted on ball bearings 17 and 18, which are fitted on the shaft sections 1 and 2. In order to insulate thermally these ball bearings 17 and 18 from the roll housing sections 9 and 10 the said ball bearings are provided on both sides with insulating bushings 21 and 22 and sealing rings 23. The insulating bushings 21 and 22 are also provided with an outer and an inner seal 24 and 26. While the inner races of the said ball bearings are fastened on the shaft by ring nuts 28 and 32, a second outer ring nut 30 and 34 respectively serves to fix the insulating bushings 21 and 22 in position and concurrently to connect the outer race of the ball bearings 17 and 18 with the roll housing sections 9 and 10. The roll housing sections 9 and 10 and the hub of the shaft sections 1 and 2 are so designed that they jointly define an annular gap 37 filled with mercury. Arranged at regular intervals on the circumference of the roll housing section 9 are expansion spaces or equalizing vessels 39 which communicate through channels 41 with the said annular gap 37, the arrangement further comprising a filling channel and a venting channel, the latter not represented, which serve to fill the whole system with mercury. The filling channel 44 is closed by a plug-screw 46. Suitable seals 48 ensure the sealing of the whole mercury-filled system.

Owing to this form of the gap between hub and electrode roll housing it is possible, despite a very compact construction of the welding roll from the stator 1, 2 to the rotor 9, 10, to transmit very heavy currents in the order of about 3000–20,000 amperes with specific loads of approximately 0.6 amperes/mm.$^2$, for instance, without involving any drawbacks or overheating. This purpose is also served by the water-cooling provided for in the fixed inner sections 1 and 2. The fact that the cooling channels largely follow the corresponding contours of the hub avoids any local overheating. The arrangement of equalizing vessels 39 over the whole circumference of the roll housing sections, e.g. six vessels for a roll diameter of 90 mm., ensures an even current distribution and, accordingly, a homogeneous load on the mercury of the annular gap 37 and on the roll. The whole mercury system is practically air-free and therefore subject to a minimum of wear.

A second embodiment for very compact construction according to FIGS. 2–4 comprises a central fixed stator in the form of a shaft 55 which presents a central bore 56 for the passage of a coolant, in particular cooling water. The two shaft-ends 58 and 59 are designed to be fitted into the two carriers 84 of the welding machine. Arranged between the two shaft-ends 58 and 59 and integral therewith is a disk 61 which, as shown in FIG. 3, presents two expansion bores 63 and 64. The stator part consisting of the shaft-ends 58 and 59 and the disk 61 is provided with two ball bearings 66 and 67 serving the rotary mounting of the rotor composed of two housing sections 71 and 72. Both housing sections 71 and 72 are interconnected by a screw-joint 79. The roll housing 71, 72 is provided on its circumference with a groove 74 to receive a wire electrode, and with two filling and venting stubs 76 and 77 which are relatively offset on the circumference. The said stubs can be closed up by plug-screws 78. Arranged between the stator 55 and the rotor formed by the two roll housing sections 71 and 72 is a gap 82 to receive an electrically conducting liquid medium, in particular mercury. Lateral sealing rings 69 are arranged to prevent the mercury from flowing into the ball bearings 66 and 67, as shown in FIG. 2. The mercury is filled in through one of the stubs 76 or 77, while the other stub 77 or 76 serves venting purposes. During the filling, air gets trapped in the expansion bores 63 and 64 and forms a gas cushion which, when the electrode roll heats up during the welding operation, permits the mercury to expand accordingly. The two roll housing sections 71 and 72 are also sealed towards outside by a seal 81. When the electrode roll has been filled with mercury, the two stubs 76 and 77 are plugged up and the plug-screws cast up or cemented up, for instance. The whole electrode roll now forms an easily removable unit, wherein the mercury channels form a self-contained system. Moreover, the mechanical connection is independent of the mounting of the roll-ends in the welding machine. Mounting is done by means of two brackets 85 which are arranged on the ends of the carriers 84, to which they are secured by bolts 86. The carriers 84 are further provided with water channels 87, the arrangement being such that suitable connection nipples which can be fitted into the channels 87 and the ends of the bore 56 make the necessary connection of the electrode roll or stator part with the cooling system. The electric connection is made through the carriers 84 and the brackets 85 and also through the shaft-ends 58 and 59. The arrangement of stator and rotor, which can be removed as a unit, ensures the secure and smooth-running mounting of the rotor on the stator, as the mounting can be carried out and tested in the factory. There is thus no need for high precision in the manufacture of carriers 84 and brackets 85 for receiving the welding roll. And as the mercury system is also completely self-contained, the electrode roll can be mounted in any position. Moreover, the re-filling with mercury does not present any problem even in the most awkward machine locations, as the job can be done by specialists in the factory while the faulty roll head is simply replaced by a new one.

In both embodiments, the entire mercury system is closed towards outside, ruling out any escape of harmful mercury vapour.

What I claim is:

1. An electrode roll for welding machines, especially for resistance welding machines with wire electrodes, comprising, in combination, a stator member having an axis and an outer surface; a rotor member partly surrounding said stator member and being mounted on the latter turnably about the axis thereof, said rotor member having an inner surface spaced from said outer surface of said stator member and defining with said outer surface an annular gap; an electrically conductive liquid substantially completely filling said annular gap for electrically connecting said stator member to said rotor member; at least one expansion space for said liquid in one of said members, said expansion space communicating with said annular gap and forming with the latter a closed space; means for stationarily mounting said stator member in the region of its axis and for connecting said stator member to a source of electrical current supply; at least one cooling channel formed in said stator member, said cooling channel being separated from and out of communication with said annular gap; and means for connecting a source of cooling fluid to said cooling channel for circulating said cooling fluid through said cooling channel.

2. An electrode roll as defined in claim 1, wherein said inner surface of said rotor member and said outer surface of said stator member are surfaces of revolution concentric with said axis.

3. An electrode roll as defined in claim 2, wherein the width of said annular gap is at most 2% of its maximum diameter.

4. An electrode roll as defined in claim 1, wherein said motor member comprises at least two sections and means for connecting said sections to each other.

5. An electrode roll as define din claim 1, wherein said rotor member comprises two sections having overlapping annular flanges and inner and outer screw threads on said flanges threadingly engaged with each other.

6. An electrode roll as defined in claim 1, wherein said electrically conductive liquid is mercury.

7. An electrode roll as defined in claim 1, wherein a plurality of expansion spaces in the form of bores in said stator member are provided which extend from said outer surface of said stator member into the latter.

8. An electrode roll as defined in claim 1, wherein a plurality of expansion spaces in the form of cavities in said rotor member are provided, said cavities are uniformly distributed about said axis and communicate with said annular gap.

9. An electrode roll as defined in claim 1, and including passage means extending through one of said members for filling and venting said annular gap and means for fluid tightly closing said passage means.

10. An electrode roll as defined in claim 1, wherein said cooling channel extends spaced from and substantially parallel to said annular gap.

11. An electrode roll as defined in claim 1, wherein said cooling channel is in the form of an axial bore through said stator member.

12. An electrode roll as defined in claim 1, wherein said stator member has a central substantially disk-shaped portion and a pair of shaft sections extending in direction of said axis to opposite sides of said central portion, said annular gap being formed about said disk-shaped central portion of said stator member.

13. An electrode roll as defined in claim 12, wherein said means for mounting said stator member and for connecting the latter to a source of electrical current supply engage the outer ends of said shaft sections of said stator member.

14. An electrode roll as defined in claim 13, and including anti-friction bearing means on said shaft sections inwardly of said outer ends thereof for turnably supporting said rotor member on said shaft sections of said stator member.

15. An electrode roll as defined in claim 14, and including electrical and thermal insulating means surrounding said bearing means and electrically insulating the latter from said rotor member, and sealing means for sealing said annular gap in the region of said bearing means.

References Cited

UNITED STATES PATENTS

| | | | |
|---|---|---|---|
| 2,044,180 | 6/1936 | Newton | 219—59 |
| 2,322,796 | 6/1943 | Fentress | 219—81 |
| 3,078,432 | 2/1963 | Kenyon | 339—110 |

JOSEPH V. TRUHE, Primary Examiner

LAWRENCE A. ROUSE, Assistant Examiner